(12) United States Patent
Choi et al.

(10) Patent No.: US 11,648,833 B2
(45) Date of Patent: May 16, 2023

(54) SUPPORT BRACKET FOR MOUNTING TRANSMISSION AND MOUNTING ASSEMBLY PROVIDED WITH THE SAME

(71) Applicants: HYUNDAI MOTOR COMPANY, Seoul (KR); KIA MOTORS CORPORATION, Seoul (KR); MAHLE DONGHYUN FILTER SYSTEMS CO., LTD, Hwaseong-si (KR)

(72) Inventors: Seung Hun Choi, Daegu (KR); Daejung Kim, Anyang-si (KR)

(73) Assignees: HYUNDAI MOTOR COMPANY, Seoul (KR); KIA MOTORS CORPORATION, Seoul (KR); MAHLE DONGHYUN FILTER SYSTEMS CO., LTD, Hwaseong-si (KR)

( * ) Notice: Subject to any disclaimer, the term of this patent is extended or adjusted under 35 U.S.C. 154(b) by 181 days.

(21) Appl. No.: 17/191,232

(22) Filed: Mar. 3, 2021

(65) Prior Publication Data

US 2022/0105792 A1    Apr. 7, 2022

(30) Foreign Application Priority Data

Oct. 5, 2020 (KR) .................. 10-2020-0127880

(51) Int. Cl.
*F16M 13/00* (2006.01)
*B60K 5/12* (2006.01)
*B60K 17/00* (2006.01)

(52) U.S. Cl.
CPC .......... *B60K 5/1291* (2013.01); *B60K 17/00* (2013.01); *B60K 5/1208* (2013.01)

(58) Field of Classification Search
CPC .............................. B60K 5/1291; B60K 17/00
See application file for complete search history.

(56) References Cited

U.S. PATENT DOCUMENTS

| 4,056,249 | A | * | 11/1977 | Hashimoto | .......... | B60K 5/1291 |
| | | | | | | 248/659 |
| 10,208,847 | B1 | * | 2/2019 | Lee | ....................... | F16F 1/3713 |
| 2018/0172135 | A1 | * | 6/2018 | Kwon | ................... | B60K 17/00 |
| 2019/0120365 | A1 | * | 4/2019 | Kim | ..................... | F16H 57/028 |

FOREIGN PATENT DOCUMENTS

KR         10-1818662 B1    1/2018

* cited by examiner

*Primary Examiner* — Amy J. Sterling
(74) *Attorney, Agent, or Firm* — McDonnell Boehnen Hulbert & Berghoff LLP (57) ABSTRACT

A support bracket for mounting a power train includes a bracket body including an engaging hole formed to insert an engaging bolt of a power train mount, an insert portion formed adjacent to the engaging hole, and a pocket formed adjacent to the insert portion, and an engaging nut inserted in the insert portion along the insert direction to engage the engaging bolt, and a stopper configured to prevent the engaging nut from separation.

9 Claims, 7 Drawing Sheets

SUPPORT BRACKET FOR MOUNTING TRANSMISSION AND MOUNTING ASSEMBLY PROVIDED WITH THE SAME

CROSS REFERENCE TO RELATED APPLICATIONS

This application claims priority to and the benefit of Korean Patent Application No. 10-2020-0127880 filed in the Korean Intellectual Property Office on Oct. 5, 2020, the entire contents of which are incorporated herein by reference.

BACKGROUND

(a) Field

The present disclosure relates to a support bracket for mounting a power train and a mounting assembly including the same. More particularly, the present disclosure relates to a support bracket for mounting a power train and a mounting assembly including the same, which can simplify the assembly process and reduce manufacturing cost.

(b) Description of the Related Art

A power train of a vehicle is a device that generates power and transmits the power to the driving wheel by changing torque and speed to suit the vehicle's running state. The power train generates a lot of vibration and noise due to the influence of engine and transmission driving.

Therefore, in mounting the power train to the vehicle body, in order to improve the ride comfort of the vehicle occupant by minimizing the transmission of vibration and noise generated from the engine and transmission to the vehicle body, a power train is mounted on the vehicle body frame using a power train mount.

Generally, the powertrain mount is bolted to a front side member forming an engine compartment. This powertrain mount is connected to a powertrain fixing bracket which is bolted to a powertrain case, and the powertrain mount is connected to the bracket for mounting the powertrain through a bolt penetrating through an insulator provided therein.

The conventional powertrain fixing bracket used as a medium connecting the powertrain and the powertrain mount is mainly made of the same aluminum as the powertrain case, and a square nut is used to be fastened with a bolt penetrating the powertrain mount.

The conventional power train fixing bracket forms a pocket in which a square nut can be installed, so that the square nut is positioned in the pocket. A stopper made of metal plate is fixed to the bracket for mounting the power train by bolts so that the square nut positioned in the pocket does not come off.

Conventional powertrain fixing brackets have an inferior moldability compared to injection molding using synthetic resin because the material is made of aluminum, the material cost is high, and it is manufactured by die casting.

In addition, since the stopper preventing the separation of the square nut has a complicated bent shape so that the square nut allows movement in the pocket and does not escape from the pocket, the manufacturing cost increases and the manufacturing process is complicated.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a support bracket for mounting a power train and a mounting assembly including the same, which can simplify the assembly process and reduce manufacturing cost.

A support bracket for mounting a power train according to an exemplary embodiment of the present disclosure may include a bracket body including an engaging hole formed to insert an engaging bolt of a power train mount, an insert portion formed adjacent to the engaging hole, and a pocket formed adjacent to the insert portion, and an engaging nut inserted in the insert portion along the insert direction to engage the engaging bolt, and a stopper configured to prevent the engaging nut from separation.

The engaging bolt may include a first bolt and a second bolt parallel to the first bolt, the engaging hole may include a first engaging hole and a second engaging hole into which the first bolt and the second bolt are respectively inserted, the engaging nut may include a first nut and a second nut that are respectively engaged with the first bolt and the second bolt, and the insert portion may include a first insert portion and a second insert portion into which the first nut and the second nut are respectively inserted.

The insert direction may be an axial direction of the engaging bolt, and the stopper may be formed to limit the movement of the engaging nut along the axial direction of the engaging bolt.

The support bracket according to an exemplary embodiment of the present disclosure may further include a rib formed inside the pocket to divide the first insert portion and the second insert portion.

The stopper may be formed on at least one of the interior surfaces of the rib or the pocket.

The stopper may include a first stopper formed on the rib, and a second stopper formed on the interior surface of the pocket.

The stopper may include an inclined portion formed along the insert direction of the engaging nut.

An assemble hole into which the engaging nut is inserted may be formed in a direction perpendicular to the axial direction of the engaging bolt in the bracket body, and the first insert portion and the second insert portion may be formed in the assemble hole.

The stopper may be formed so that the first nut and the second nut are not separated from the first insert portion and the second insert portion.

The support bracket according to an exemplary embodiment of the present disclosure may further include ribs formed adjacent to the first insert portion and the second insert portion.

The ribs may include a horizontal rib and a vertical rib connected to the horizontal rib perpendicularly and formed adjacent to the first insert portion and the second insert portion.

A first rib hole in which the first bolt protrudes and a second rib hole in which the second bolt protrudes may be formed in the vertical rib.

The power train mount may combine at least one of an engine, a transmission, a motor and a reducer to the vehicle body.

A mounting assembly according to an exemplary embodiment of the present disclosure may include a power train mount, a first nut and a second nut, a bracket body in which a first engaging hole and a second engaging hole are formed, a first insert portion and a second insert portion into which the first nut and the second nut are respectively inserted are formed, and a pocket is formed adjacent to the first insert portion and the second insert portion, and a first bolt and a second bolt that engage with the first nut and second nut, respectively, to connect the power train mount and the bracket body, wherein, a stopper may be formed to prevent the first nut and second nut from separation.

The mounting assembly according to an exemplary embodiment of the present disclosure may further include a rib formed inside the pocket to divide the first insert portion and the second insert portion.

The stopper may be formed on at least one of the interior surfaces of the rib or the pocket.

The stopper may include an inclined portion formed along the insert direction of the engaging nut.

An assemble hole into which the engaging nut is inserted may be formed in a direction perpendicular to the axial direction of the engaging bolt in the bracket body, and the first insert portion and the second insert portion may be formed in the assemble hole.

The mounting assembly according to an exemplary embodiment of the present disclosure may further include ribs formed adjacent to the first insert portion and the second insert portion.

The ribs may include a horizontal rib, and a vertical rib connected to the horizontal rib perpendicularly and formed adjacent to the first insert portion and the second insert portion.

According to an exemplary embodiment of the present disclosure, a support bracket for mounting a power train and a mounting assembly including the same can simplify the configuration and reduce the number of parts, thereby simplifying the assembly process and reducing manufacturing costs.

In addition, by manufacturing a support bracket for mounting a power train according to an exemplary embodiment of the present disclosure with synthetic resin, it is possible to reduce manufacturing cost and weight.

In addition, effects that can be obtained or predicted by the embodiments of the present disclosure will be disclosed directly or implicitly in the detailed description of the embodiments of the present disclosure. That is, various effects predicted according to an embodiment of the present disclosure will be disclosed within a detailed description to be described later.

BRIEF DESCRIPTION OF THE FIGURES

These drawings are for reference only in describing exemplary embodiments of the present disclosure, and therefore, the technical idea of the present disclosure should not be limited to the accompanying drawings.

DETAILED DESCRIPTION

In the following detailed description, only certain exemplary embodiments of the present disclosure have been shown and described, simply by way of illustration.

As those skilled in the art would realize, the described embodiments may be modified in various different ways, all without departing from the spirit or scope of the present disclosure Parts indicated by the same reference numerals throughout the specification mean the same components.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless otherwise stated.

An exemplary embodiment of the present disclosure will hereinafter be described in detail with reference to the accompanying drawings.

Figure 1:
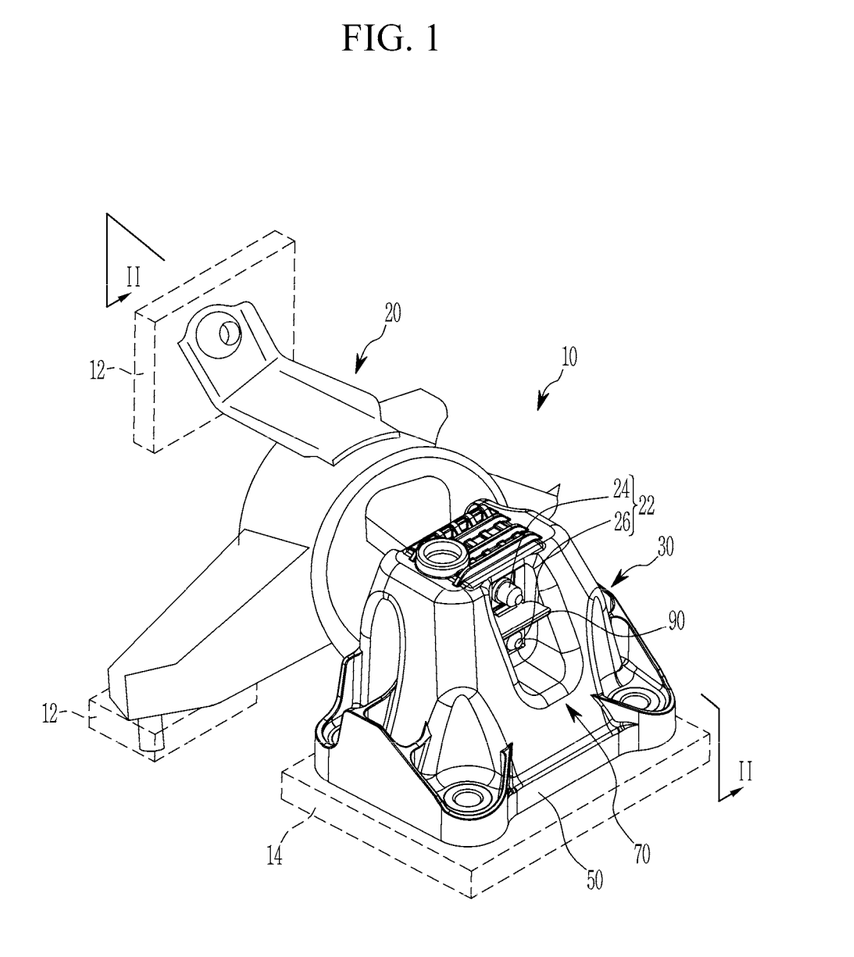
FIG. 1 is a perspective view of a mounting assembly according to an exemplary embodiment of the present disclosure.
Figure 2:
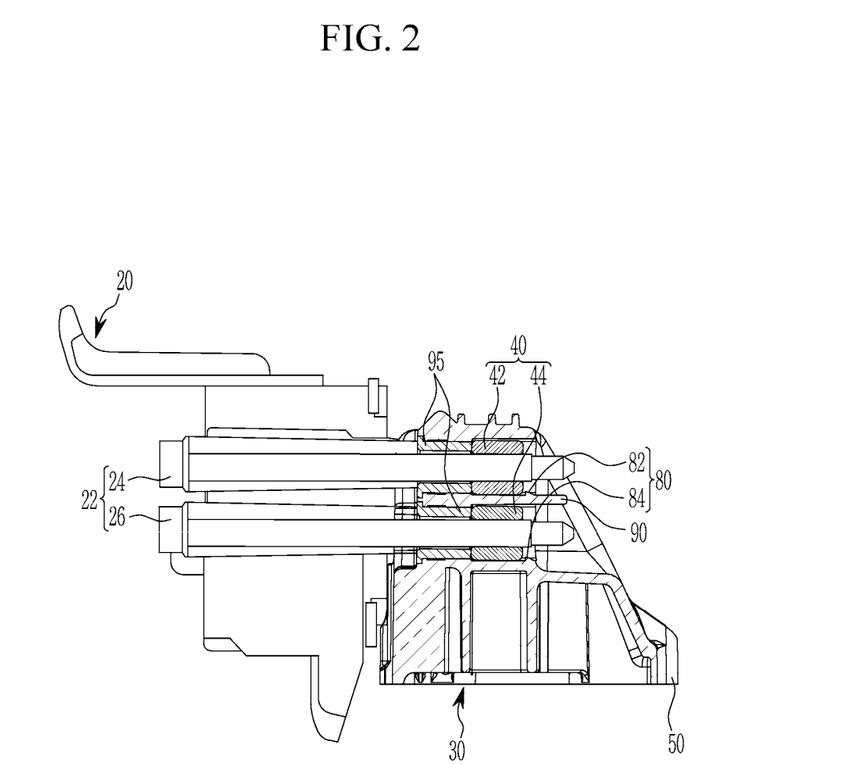
FIG. 2 is a cross-sectional view along the line II-II of FIG. 1.

FIG. 1 is a perspective view of a mounting assembly according to an exemplary embodiment of the present disclosure, and FIG. 2 is a cross-sectional view along the line II-II of FIG. 1.

Referring to FIG. 1 and FIG. 2, a mounting assembly 10 according to an exemplary embodiment of the present disclosure includes a power train mount 20 mounted on a vehicle body 12 and a support bracket 30 for mounting a power train connected to a power train 14.

The vehicle body 12 may be, for example, a side member, and the support bracket 30 for mounting a power train may be mounted to, for example, a power train housing 14.

The power train mount 20 and the support bracket 30 can be joined via engaging bolt 22.

The power train 14 may include at least one of an engine, a transmission, a motor and a reducer, and the power train mount 20 may combine at least one of the engine, the transmission, the motor and the reducer to the vehicle body 12 can do.

Figure 3:
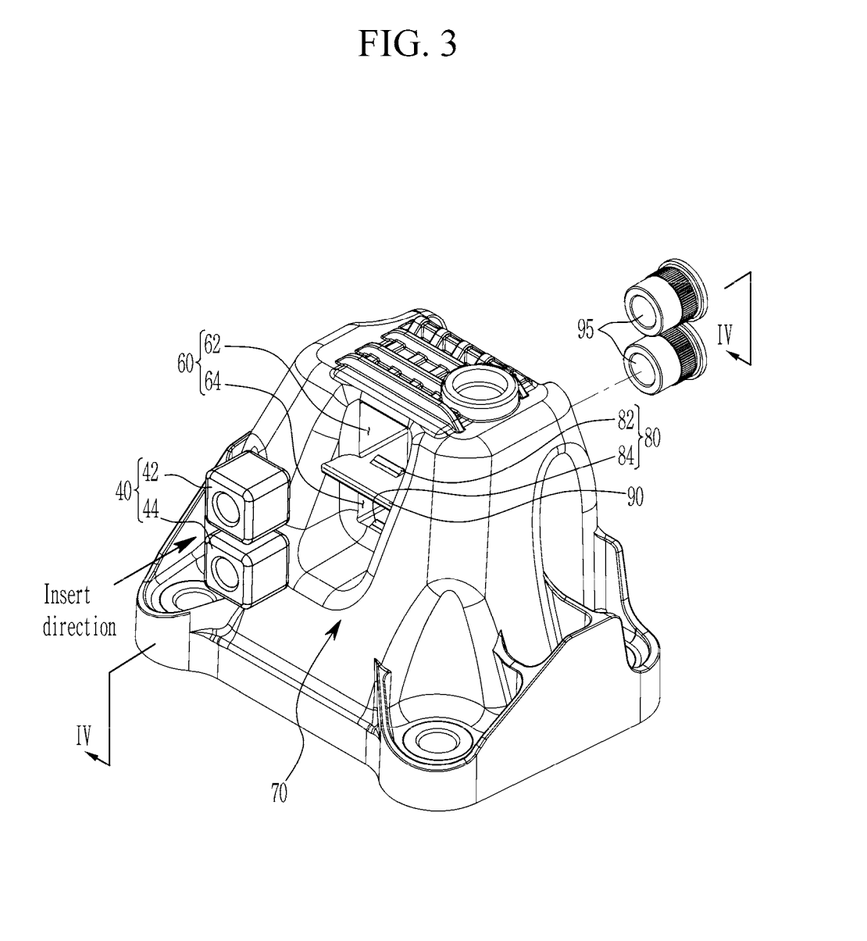
FIG. 3 is a perspective view of a support bracket for mounting a power train according to an exemplary embodiment of the present disclosure.
Figure 4:
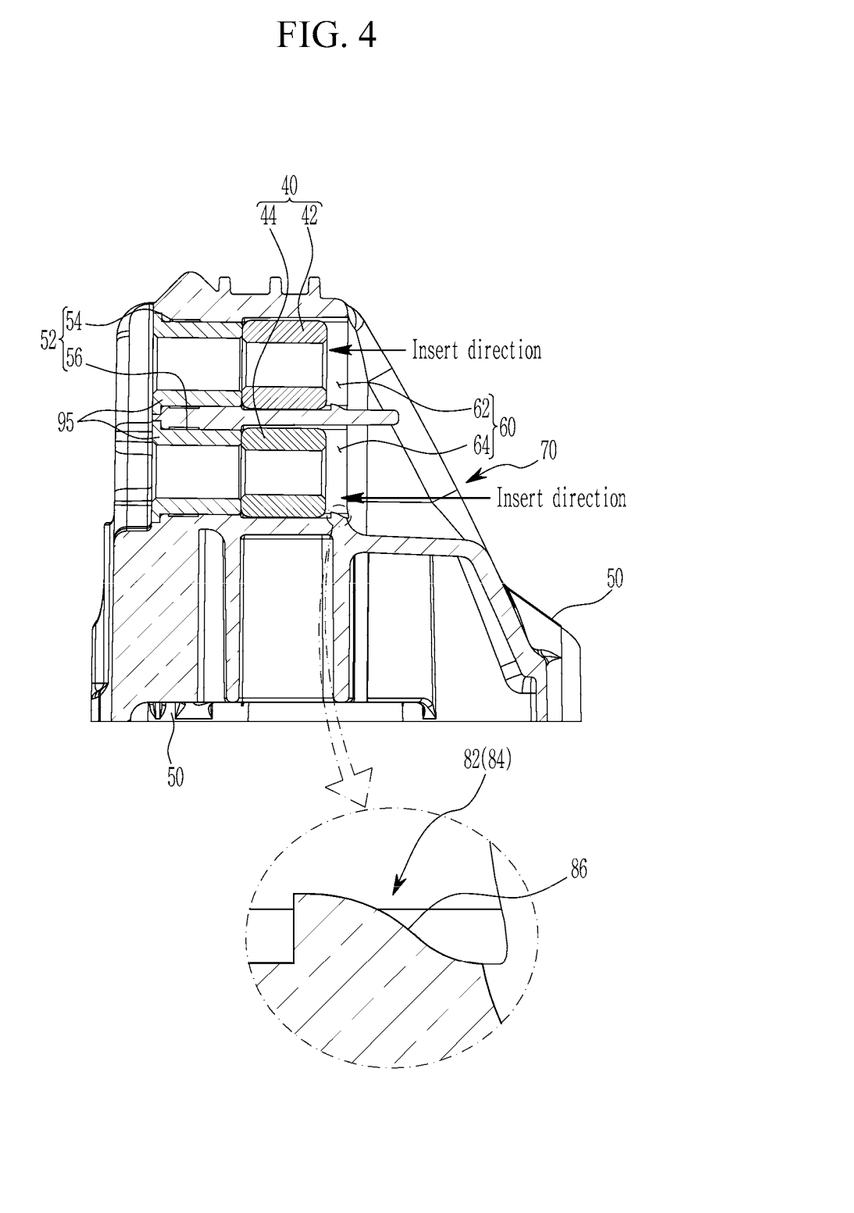
FIG. 4 is a cross-sectional view along the line IV-IV of FIG. 3.

FIG. 3 is a perspective view of a support bracket for mounting a power train according to an exemplary embodiment of the present disclosure, and FIG. 4 is a cross-sectional view along the line IV-IV of FIG. 3.

Referring to FIG. 3 and FIG. 4, the support bracket 30, which can be applied to the mounting assembly 10 according to an exemplary embodiment of the present disclosure, may include a bracket body 50 including an engaging hole 52 formed to insert the engaging bolt 22 of the power train mount 20, an insert portion 60 formed adjacent to the engaging hole 52 and a pocket 70 formed adjacent to the insert portion 60. The support bracket 30 may further include an engaging nut 40 inserted in the insert portion 60 along the insert direction to engage the engaging bolt 22. A stopper 80 can be formed to prevent the engaging nut 40 from separation.

The engaging bolt 22 may include a first bolt 24 and a second bolt 26 parallel to the first bolt 24. That is, the first bolt 24 and the second bolt 26 are formed in a direction parallel to the vibration transmission direction transmitted from the power train housing 14, so that the vibration transmitted to the insulator of the power train mount 20 can be reduced.

The engaging hole 52 may include a first engaging hole 54 and a second engaging hole 56 into which the first bolt 24 and the second bolt 26 are respectively inserted, and the engaging nut 40 may include a first nut 42 and a second nut 44 that are respectively engaged with the first bolt 24 and the second bolt 26.

Bushes 95 may be inserted into the first engaging hole 54 and the second engaging hole 56, respectively, to support the first bolt 24 and the second bolt 26.

The insert portion 60 may include a first insert portion 62 and a second insert portion 64 into which the first nut 42 and the second nut 44 are respectively inserted.

The insert direction may be an axial direction of the engaging bolt 22, and the stopper 80 may be formed to limit the movement of the engaging nut 40 along the axial direction of the engaging bolt 22.

That is, the first insert portion 62 and the second insert portion 64 may be formed inside the pocket 70 along the axial direction of the first bolt 24 and the second bolt 26.

A support bracket 30 for mounting a power train according to an exemplary embodiment of the present disclosure may further include a rib 90 formed inside the pocket 70 to divide the first insert portion 62 and the second insert portion 64.

The shape of the pocket 70 formed in the bracket body 50 facilitates the assemble of the first nut 42 and the second nut 44, and deformation of the bracket body 50 by the vibration and load transmitted from the power train housing 14 can be prevented. In addition, the rib 90 is formed inside the pocket 70, so that the strength of the bracket body 50 can be additionally increased.

The stopper 80 is formed on at least one of the interior surfaces of the rib 90 or the pocket 70 to prevent the first nut 42 and the second nut 44 from separation.

For example, the stopper 80 may include a first stopper 82 formed on the rib 90 and a second stopper 84 formed on the interior surface of the pocket 70, but is not limited thereto, may be formed above and below the rib 90, may be formed on the inner side of the first insert portion 62 and the second insert portion 64.

The stopper 80 may include an inclined portion 86 formed along the insert direction of the engaging nut 40.

The bracket body 50 may be formed of synthetic resin.

The first nut 42 and the second nut 44 are smoothly inserted into the first insert portion 62 and the second insert portion 64 by the inclined portion 86, but are prevented from being separated from the first insert portion 62 and the second insert portion 64. In addition, since the bracket body 50 is formed of synthetic resin, the stopper 80 can be transformed to a small degree, making it easy to insert the first nut 42 and the second nut 44.

The engaging nut 40 contacts the interior surfaces of the first insert portion 62 and the second insert portion 64, and can be fixed when it is combined with the first bolt 24 and the second bolt 26. The engaging nut 40 is shown as a square shape in the drawing, but is not limited thereto, and can be formed in a polygon shape, for example a pentagonal, hexagonal, or octagonal shape. In other words, various shapes that is fixed when combined with the first bolt 24 and the second bolt 26 can be applied.

Figure 5:
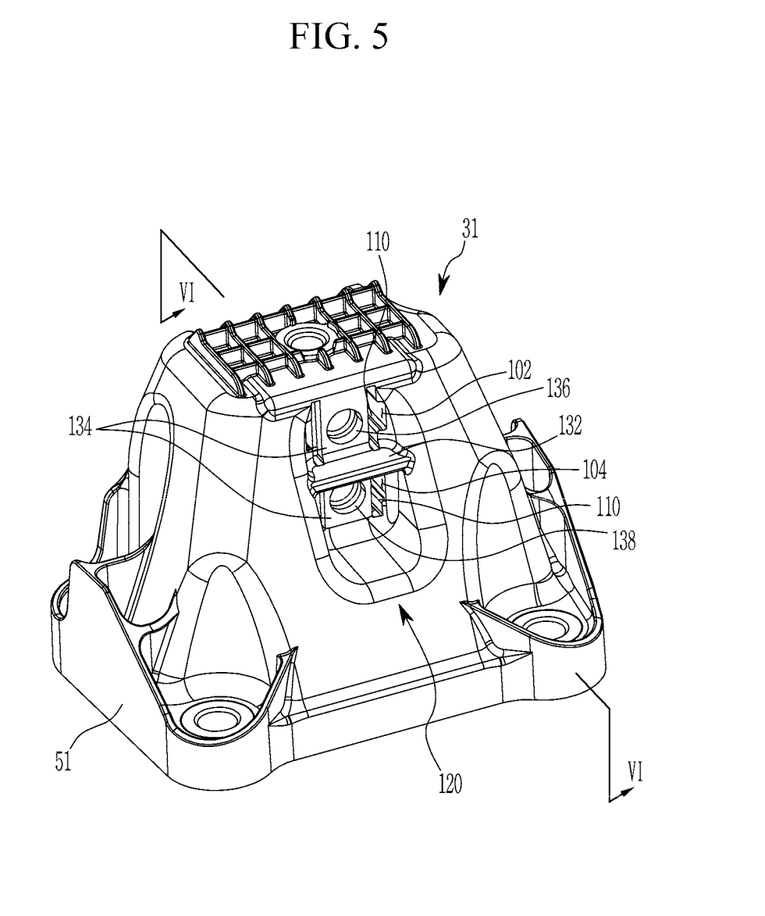
FIG. 5 is a perspective view of a support bracket for mounting a power train according to another exemplary embodiment of the present disclosure.
Figure 6:
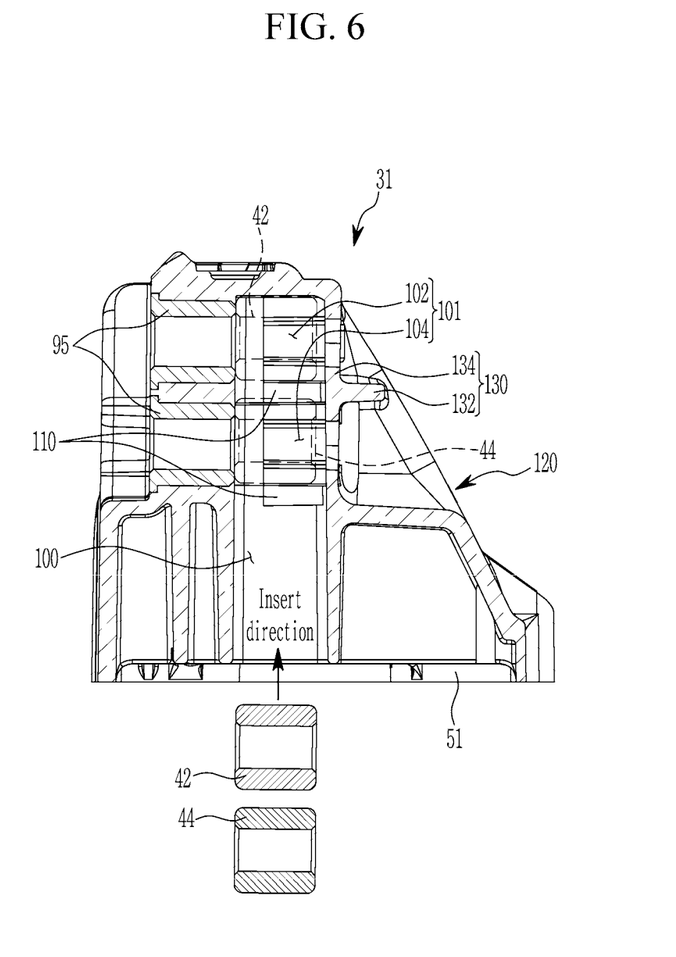
FIG. 6 is a cross-sectional view along the line VI-VI of FIG. 5.
Figure 7:
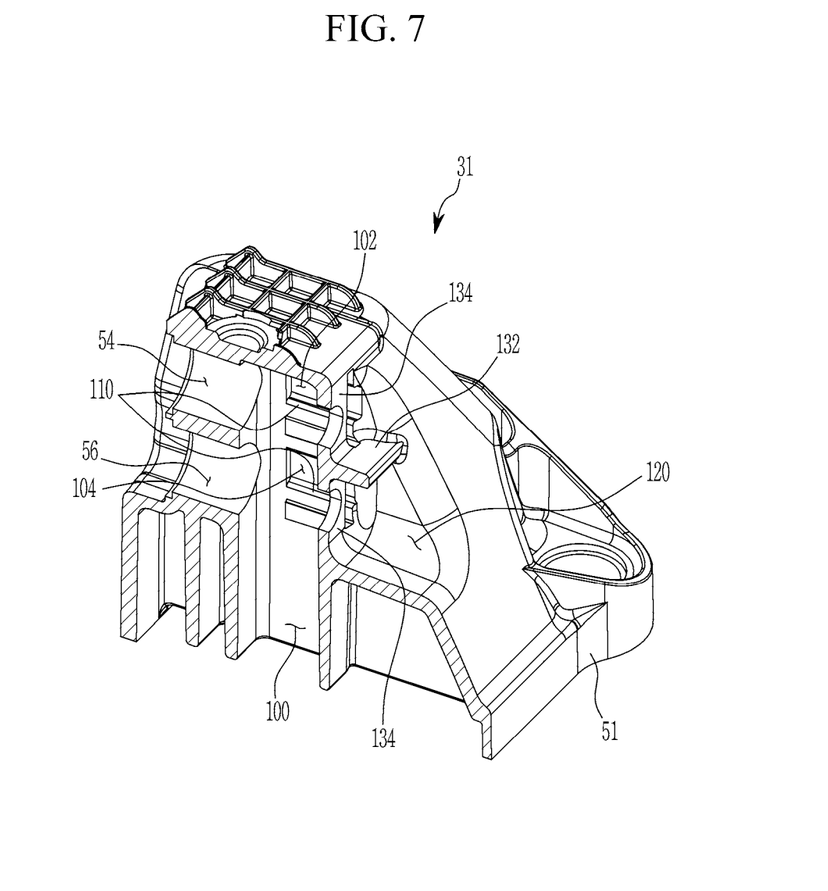
FIG. 7 is a perspective cross-sectional view along the line VI-VI of FIG. 5.

FIG. 5 is a perspective view of a support bracket for mounting a power train according to another exemplary embodiment of the present disclosure, FIG. 6 is a cross-sectional view along the line VI-VI of FIG. 5, and FIG. 7 is a perspective cross-sectional view along the line VI-VI of FIG. 5.

In describing a support bracket for mounting a power train according to another exemplary embodiment of the present disclosure shown in FIG. 5 to FIG. 7, for ease of understanding, the same reference numerals are used for a support bracket for mounting a power train and the same configuration according to an exemplary embodiment of the present disclosure shown in FIG. 3 and FIG. 4, and repeated descriptions are omitted.

A support bracket 31 for mounting a power train according to another exemplary embodiment of the present disclosure includes a bracket body 51, and in the bracket body 51, an assemble hole 100 into which the engaging nut 40 is inserted is formed in perpendicular to the axial direction of the engaging bolt 22. An insert portion 101 into which the engaging nut 40 is inserted is formed in the assemble hole 100. That is, a first insert portion 102 and a second insert portion 104 into which the first nut 42 and the second nut 44 coupled with the first bolt 24 and the second bolt 26 are respectively inserted may be formed in the assemble hole 100.

Therefore, in another exemplary embodiment of the present disclosure, a support bracket 31 for mounting a power train the first nut 42 and the second nut 44 may be inserted from the lower portion of the bracket body 51 to the upper portion.

Stoppers 110 may be formed so that the first nut 42 and the second nut 44 are not separated from the first insert portion 102 and the second insert portion 104, respectively.

A support bracket 31 for mounting a power train according to another exemplary embodiment of the present disclosure may further include ribs 130 formed adjacent to the first insert portion 102 and the second insert portion 104.

The ribs 130 may include a horizontal rib 132 and a vertical rib 134 connected to the horizontal rib 132 perpendicularly and formed adjacent to the first insert portion 102 and the second insert portion 104.

A first rib hole 136 in which the first bolt 24 is protruded and a second rib hole 138 in which the second bolt 26 is protruded may be formed in the vertical rib 134. In other words, referring to FIG. 2, when the power train mount 20 and a support bracket 31 for mounting a power train according to another exemplary embodiment of the present disclosure are combined, the first bolt 24 and the second bolt 26 may protrude through the first rib hole 136 and the second rib hole 138.

The horizontal rib 132 can reinforce the strength of the bracket body 51 by connecting the inside of pocket 12 formed in the bracket body 51, and the first and second rib holes 136, and 138 of the vertical rib 134 support the first bolt 24 and the second bolt 26 to reinforce the strength of the bracket body 51.

According to an exemplary embodiment of the present disclosure, a support bracket for mounting a power train and a mounting assembly including the same can simplify the configuration and reduce the number of parts, thereby simplifying the assembly process and reducing manufacturing costs.

In other words, the assemble process of the engaging bolt and the engaging nut can be simplified by fixing the engaging nut without separate components of a complex configuration.

In addition, by manufacturing a support bracket for mounting a power train according to an exemplary embodiment of the present disclosure with synthetic resin, it is possible to reduce manufacturing cost and weight.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A support bracket for mounting a power train comprising:
   a bracket body including an engaging hole through which an engaging bolt of a power train mount is inserted, an insert portion formed adjacent to the engaging hole, and a pocket formed adjacent to the insert portion;
   an engaging nut inserted into the insert portion along the insert direction to engage the engaging bolt; and
   a stopper configured to prevent the engaging nut from separation;
   wherein the engaging bolt includes a first bolt, and a second bolt parallel to the first bolt;
   the engaging hole includes a first engaging hole and a second engaging hole into which the first bolt and the second bolt are respectively inserted;
   the engaging nut includes a first nut and a second nut that are respectively engaged with the first bolt and the second bolt; and
   the insert portion includes a first insert portion and a second insert portion into which the first nut and the second nut are respectively inserted;
   wherein the insert direction is an axial direction of the engaging bolt; and
   the stopper is configured to limit the movement of the engaging nut along the axial direction of the engaging bolt;
   wherein the support bracket further comprises a rib formed inside the pocket to divide the first insert portion and the second insert portion.

2. The support bracket of claim 1, wherein the stopper is formed on at least one of the interior surfaces of the rib or the pocket.

3. The support bracket of claim 1, wherein the stopper comprises:
   a first stopper formed on the rib; and
   a second stopper formed on the interior surface of the pocket.

4. The support bracket of claim 1, wherein the stopper comprises an inclined portion formed along the insert direction of the engaging nut.

5. The support bracket of claim 1, wherein:
   an assemble hole into which the engaging nut is inserted is formed in a direction perpendicular to the axial direction of the engaging bolt in the bracket body; and
   the first insert portion and the second insert portion are formed in the assemble hole.

6. The support bracket of claim 5, wherein the stopper is formed so that the first nut and the second nut are not separated from the first insert portion and the second insert portion.

7. The support bracket of claim 1, wherein the power train mount combines at least one of an engine, a transmission, a motor, and a reducer to the vehicle body.

8. A mounting assembly comprising:
   a power train mount;
   a first nut;
   a second nut;
   a bracket body in which a first engaging hole and a second engaging hole are formed;
   a first insert portion and a second insert portion into which the first nut and the second nut are respectively inserted are formed; and
   a pocket formed adjacent to the first insert portion and the second insert portion;
   a first bolt and a second bolt that engage with the first nut and second nut, respectively, to connect the power train mount and the bracket body; and
   a stopper configured to prevent the first nut and second nut from separation;
   wherein an assemble hole into which the engaging nut is inserted is formed in a direction perpendicular to the axial direction of the engaging bolt in the bracket body; and
   the first insert portion and the second insert portion are formed in the assemble hole; and
   wherein the mounting assembly further comprises a plurality of ribs formed adjacent to the first insert portion and the second insert portion.

9. The mounting assembly of claim 8, wherein the plurality of ribs comprise:
   a horizontal rib; and
   a vertical rib connected to the horizontal rib perpendicularly and formed adjacent to the first insert portion and the second insert portion.

* * * * *